United States Patent [19]

Alberti

[11] 4,394,585

[45] Jul. 19, 1983

[54] POWER CIRCUIT-BREAKER WITH REMOTE-CONTROLLABLE OPERATION THRESHOLD

[76] Inventor: Rosette Alberti, 7 rue Marie Bonaparte, 92 210 Saint-Cloud, France

[21] Appl. No.: 263,020

[22] Filed: May 12, 1981

[30] Foreign Application Priority Data

May 14, 1980 [FR] France .................. 80 10861

[51] Int. Cl.³ .................. H01H 3/26; H02J 1/00
[52] U.S. Cl. .................. 307/140; 307/38
[58] Field of Search .......... 340/310 A; 307/35, 38, 307/39, 40, 140

[56] References Cited

U.S. PATENT DOCUMENTS

| | | | |
|---|---|---|---|
| 988,093 | 3/1911 | Hart .................. | 307/140 |
| 2,981,869 | 4/1961 | Balint .................. | 307/38 X |
| 4,023,043 | 5/1977 | Stevenson .................. | 307/38 |
| 4,152,605 | 5/1979 | Conde .................. | 307/3 |

FOREIGN PATENT DOCUMENTS

| | | |
|---|---|---|
| 356226 | 7/1922 | Fed. Rep. of Germany . |
| 2404234 | 7/1975 | Fed. Rep. of Germany . |
| 1038284 | 9/1953 | France . |
| 1435803 | 3/1966 | France . |
| 2464588 | 6/1981 | France . |

*Primary Examiner*—Donald A. Griffin
*Attorney, Agent, or Firm*—Young & Thompson

[57] ABSTRACT

The present invention relates to a power circuit-breaker with remote-controllable operation threshold.

The switching out of the circuit-breaker 1 being provided by an electro-magnetic release 2, there is foreseen at least one captor 9a to 9f for detecting a predetermined position of the control element 3 of the release sensitive to the intensity consumed, and said captor sends, when said position is reached, and under the control of a centralized remote-control receiver 11, the control current to the release 2.

The invention is applicable to the modulation of the consumable power by the users and its adaptation to the production capacity.

4 Claims, 2 Drawing Figures

POWER CIRCUIT-BREAKER WITH REMOTE-CONTROLLABLE OPERATION THRESHOLD

BACKGROUND OF THE INVENTION

A power circuit-breaker with remote-controllable operation threshold has already been proposed in the German published patent application No. 2.404.234.

Apart from the embodiment comprising two limiting elements in series, such as bimetallic strips, one of which can be shunted by the remote-control member, this patent also suggests a circuit-breaker with a single thermal limiting member such as a bimetallic strip with an additional heating device of said bimetallic strip which is set under tension by the remote-control member for lowering the operation threshold of the release device by creating a predeformation of the bimetallic strip.

The embodiment with two limiting elements in series is complex and cumbersome, making it impossible to house the device in casings of usual size. Moreover, when two bimetallic strips as proposed in said patent are concerned, there is a thermal influence between the bimetallic strips which makes practically impossible the adjustment of the two thresholds. This disadvantage is still more marked where, in the case proposed as only solution in said patent for an embodiment with a single detector element, the single bimetallic strip is combined with a heating device which is switched on by the centralized remote control receiver for reducing the intensity at which the circuit-breaker cuts out. In addition to the fact that the heating device consumes continuously during the load-shedding period, the influence of an additional heating device on the switching out threshold of the bimetallic release device is very indetermined and the adjustment of the switching out threshold is practically impossible.

A power circuit-breaker with remote-controllable operation threshold is disclosed in French Pat. No. 79.21897 dated Aug. 31, 1979, wherein the remote control is provided by the switching on or off or modification of the value of a derivation resistor mounted in parallel with a detector of the release so as to modify the fraction of the total intensity acting on said release detector. This embodiment has the advantage that the operation threshold of the release detector corresponds, whatever the adjustment of the threshold, to the same intensity flowing through the release detector, thereby facilitating the adjustment and providing stability of the operation. The contactor of the remote control providing the switching on or off of the derivation resistors is not subjected to a voltage at the terminals during the cut out, therefore subject to the formation of an arc, since it is shunted at least by the release detector, but it must nevertheless have a very low resistance for letting through a high intensity, which can be the source of problems for its manufacture and its size.

OBJECTS AND SUMMARY OF THE INVENTION

The object of the present invention is to remedy such disadvantages by providing a power circuit-breaker with remote-controllable operation threshold where the contactor of the remote control is possibly operated under tension, but through which flows a very weak current during a very short period, thereby allowing to make it as a very small power relay, and possibly as a single transistor. The invention is based on the fact that power circuit-breakers are also, generally, differential circuit-breakers comprising a differential transformer comparing the currents flowing through the various phases and sending a current of reduced power, function of the desequilibrium between the phases, to a release relay controlling the closing of the circuit-breaker. Differential circuit-breakers can operate under leak currents of the order of a few tens of milliamperes.

On the other hand, the control elements of the releases of the power circuit-breakers have generally, for example in the case of bimetallic strips, displacement curves function of the current flowing through them, well defined, under the proviso that they are not subjected to outer influences.

Consequently, the object of the invention is a power circuit-breaker with remote-control of the operation threshold, comprising at least a captor for detecting a predetermined position of the control element of the release, sensitive to the intensity consumed, said captor sending, when said position is reached and under the control of a centralized remote-control receiver, a control current to the circuit-breaker release.

The captor can be a simple contact element coming in contact with the bimetallic strip forming the control element of the release during the deformation of the latter, said resilient contact having an adjustable end of stroke position.

In the case of a differential type power circuit-breaker, the captor establishes a leakage current higher than the differential circuit-breaker threshold between a point of a phase upstream of the differential transformer and a point of another phase downstream of said differential transformer. When this leakage current appears, it releases the circuit breaker through its differential detector, and a current of the order of a few tens of milliamperes acting during the release delay of the closing of the circuit-breaker is then sufficient. Consequently, the power circuit-breaker can comprise a plurality of captors acting for various current intensities flowing through the detection captor and corresponding to fractions of the nominal release intensity of the detection captor, the captors chosen as a function of the normal and emergency or minimum powers allocated to the user being connected, at least for one of them, through a contactor controlled by the centralized remote-control receiver. Preferably, this adjustment scale for the captors is combined with the possibility of adjusting the threshold with usual derivation resistors. This allows obtaining a range adjustment much larger at the same time for the maximum power and for the emergency power, and even to multiply the adjustment thresholds for providing a finer modulation of the power usable by each user as a function of the available power.

BRIEF DESCRIPTION OF THE DRAWINGS

The invention will become more apparent from the following description of two embodiments, with reference to the accompanying drawings wherein.

DETAILED DESCRIPTION OF THE INVENTION

Figure 1:
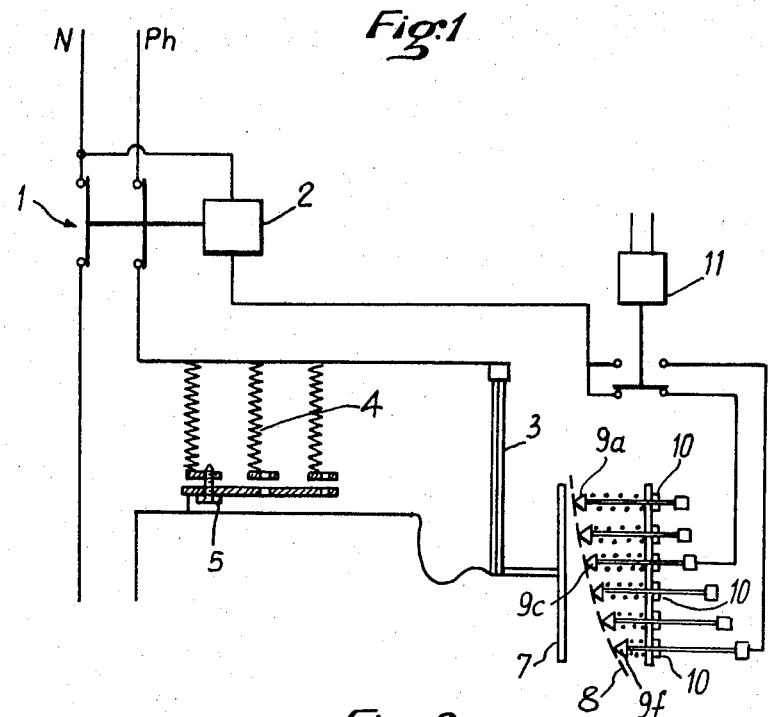
FIG. 1 is an electric diagram of a power-circuit breaker with remote control of the operation threshold, according to the invention.

In the two embodiments, reference numeral 2 designates the main contactor of the circuit-breaker, switching off the phase Ph and the neutral N and possibly the other phases, and reference numeral 2 a coil controlling the opening of the contactor. Reference numeral 3 designates the intensity detector element represented by a bimetallic strip but which could also be an armature progressive attraction relay or a deviation electro-magnetic device of the amperemeter type. Reference numeral 4 designates an assembly of calibration resistors, in parallel with the detector element, which, in known manner, can be switched on by contact elements such as screws 5 for derivating a fraction of the phase current so that only a fraction of the consumed intensity has an influence on the detector element.

In the embodiment of FIG. 1, the difflection of the bimetallic strip 3 controls the displacement of a contact piece 7 which, in practice, is a blade perpendicular to the plane of the Figure, the displacement of said blade which is a function of the intensity being represented by the broken line 8. With this contact piece 7 cooperate a series of contacts 9a to 9f resiliently mounted and the position of which is adjustable by an abutment 10 such that the contact is established on each of them for a determined value of the current intensity flowing through detector element 3, for example from 0.5 to 3 amperes for contacts 9a to 9f. According to the selection of resistors 4, the current intensity through detector element 3 is equal to the totality, to ½, to ⅓ or to ¼ of the total intensity called by the consumer, that is 3, 6, 9 or 12 amperes if the value of one resistor 4 is equal to the value of the internal resistance of detector 3. The remote-control receiver 11 is a contactor establishing the connection, in the embodiment shown, either on contact 9c, or on contact 9f, and the current resulting from the connection is sent to the control coil 2 of the contactor.

With the connection mode represented, the remote-control receiver 11 not being energized, the connection of coil 2 is established on contact 9c, corresponding to the minimum usable power or emergency power. A single resistor 4 being switched on, half of the current consumed flows through detector element 3 and contact 9c is closed when the intensity of the consumed current reaches 1.5×2=3 amperes and contact 9f when said intensity reaches 3×2=6 amperes. In the absence of energization of the remote-control receiver 11, the circuit-breaker will cut out when the consumed intensity will reach 3 amperes. If on the contrary it is energized and provides the connection on contact 9f, the circuit-breaker will cut out for 6 amperes. It will be appreciated that the maximum intensity can, by selecting the number of resistors 4, vary from 3 to 12 amperes and that the minimum intensity can be fixed between 0.5 and 10 amperes, more exactly between 1/6 and 5/6 of the maximum intensity.

Figure 2:
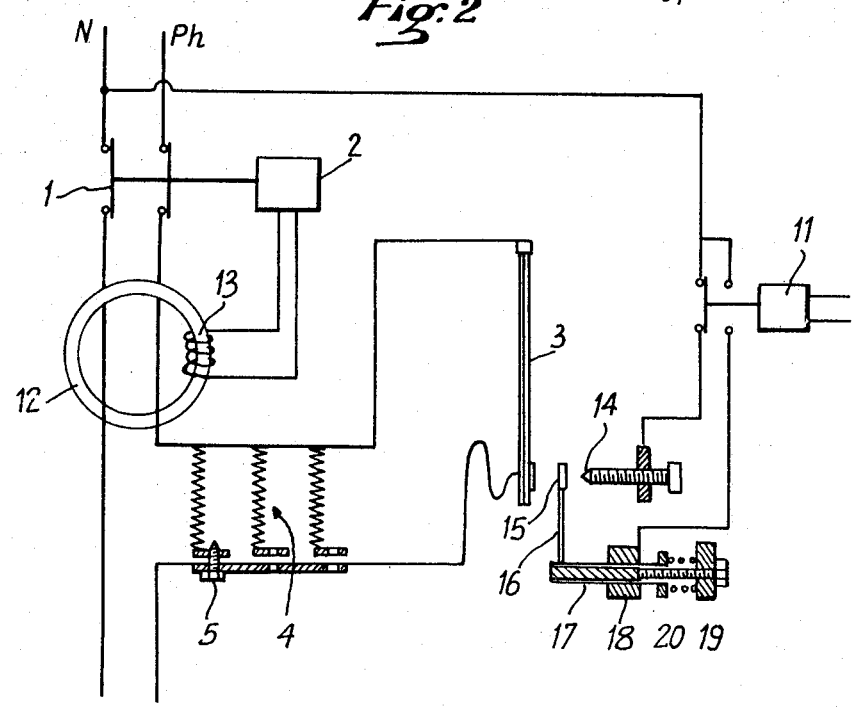
FIG. 2 is a corresponding electric diagram applied to a so-called differential circuit-breaker.

In the embodiment of FIG. 2, the circuit-breaker is of the differential type and it comprises a differential transformer 12 the secondary 13 of which feeds the coil 2 of the release. The detector device of the value of the intensity through detector element 3 could be identical to that of FIG. 1. As an alternative, it comprises a detection contact of the maximum intensity, formed by an adjustable screw 14 and a contact for detecting an intermediate intensity 15 carried by a flexible tong 16 carried by threaded support tube 17 guided in a bearing element 18, the position being adjustable by a screw 19 compressing a return spring 20. The remote-control receiver 11, in the energized state, establishes the connection between the neutral upstream the differential transformer 12 and contact 14 and, when non energized, the same connection on contact 15. Consequently, the device establishes a faulty or leakage current adapted for causing the operation of the circuit-breaker when there is a contact of the detector element 3 either on contact 15, or on contact 14, according to the state of the remote-control receiver 11.

The two hereabove embodiments which are described by way of examples can receive many modifications without departing from the scope of the invention as defined in the appended claims.

I claim:

1. A power circuit-breaker with remote-control of the operation threshold, comprising at least a detection captor of a predetermined position of the control element of the release sensitive to the intensity consumed and a release of the circuit-breaker made of an electro-magnetic element, the control element of the release being a bimetallic strip and the captor a contact element coming in contact with said bimetallic strip, when said position is reached, and sending under the control of a centralized remote-control receiver, a control current to the circuit-breaker release.

2. A circuit-breaker according to claim 1, said circuit-breaker being of a differential type, wherein the captor establishes a leakage current higher than the differential circuit-breaker threshold between a point of a phase downstream of the differential transformer and a point of another phase upstream of said differential transformer.

3. A circuit-breaker according to claim 2, and a series of derivation resistors, selectable for shunting the detector element and adjusting the release threshold.

4. A circuit-breaker according to claim 1, there being a plurality of said captors acting for various intensities of the current flowing through the detection captor and corresponding to fractions of the nominal release intensity of the detection captor, at least one of the captors chosen as a function of the normal and emergency powers allocated to the user being connected through a contactor controlled by the centralized remote-control receiver.

* * * * *